2,834,755
PHENOLIC LIQUID RESINS

Louis M. Higashi and Reino A. Jarvi, San Jose, Calif., assignors to Monsanto Chemical Company, St. Louis, Mo., a corporation of Delaware No Drawing. Application November 9, 1955
Serial No. 545,999

4 Claims. (Cl. 260—57)

This invention relates to liquid phenolic resins. More particularly the invention relates to a process and method for preparing liquid phenolic resins.

Liquid phenolic resin is a term applied in the art to condensation products of a phenol with an aldehyde which have not been isolated from the aqueous reaction medium in which they are formed and which may or may not have been diluted with an organic solvent. The major difficulties attendant upon the production of these resins have been the development of dark color during the reaction, difficulty of removal of catalyst after the reaction is completed, and poor dilutability of the liquid resin with water.

One of the objects of this invention is to provide improved liquid phenolic resins.

A further object is to provide light-colored, stable and water-dilutable liquid phenolic resins.

Another object is to provide a process for the preparation of improved liquid phenolic resins.

These and other objects are attained by reacting a phenol with formaldehyde in the presence of barium hydroxide under carefully controlled conditions; cooling the reaction medium rapidly, neutralizing the cooled medium with orthophosphoric acid to a pH of 6.0–7.5 diluting the neutralized medium with water and then filtering the neutralized medium.

The following examples are illustrative of the process and products of this invention. Where parts are mentioned, they are parts by weight.

Example I

Mix together 100 parts of phenol, 27 parts of formalin (37% formaldehyde), 66 parts of 91% flake paraformaldehyde, and 8 parts of barium hydroxide octahydrate. As soon as all of the ingredients are mixed, reaction starts and the temperature rises gradually to about 60° C. At this point, apply sufficient vacuum to maintain the temperature at 60° C. accompanied by refluxing until all of the paraformaldehyde is dissolved. Increase the temperature of the reaction medium to about 71° C. at reduced pressure and continue the reaction at this temperature under reflux until the free formaldehyde content of the reaction medium is less than 5% by weight. Cool the reaction medium quickly to 30° C. and add sufficient orthophosphoric acid to reduce the pH of the reaction medium to about 7.0 (about 2.3 parts of 85% orthophosphoric acid). Dilute the product thus obtained with water, in quantity by weight which is greater than one-half of the weight of resin at a temperature of 30° C. or less. After a short time crystals of barium phosphate form and may be easily removed by filtration. The product is a liquid phenol formaldehyde resin of about 45% solids by weight. It has a pH of 7.0 and is infinitely dilutable with water. The ash content of the liquid resin is 0.3 of 1% by weight. When this product is heated to dry off the water and then further heated at 160° C. for 12 minutes to completely cure the resin, the cured product has only a pale yellow color.

Example II

Mix together 100 parts of phenol, 17 parts of water, 77 parts of 91% flake paraformaldehyde, and 8 parts of barium hydroxide octahydrate and prepare a liquid resin as shown in Example I. The product so obtained is substantially identical with that of Example I.

If the process of either Example I or Example II is repeated with the exception that the pH of the reaction medium is lowered to 6.2 rather than 7.0 after the cooling step, the resulting liquid resin will contain substantially no ash.

The resins of this invention are prepared from monohydric phenols such as phenol, cresols, xylenols or mixtures thereof. The phenols are condensed with from 0.8 to 3 mols of formaldehyde per mol of phenol under alkaline conditions, i. e. pH of 7.2–9.0. The formaldehyde should be in the form of paraformaldehyde although a minor part of the paraformaldehyde may be replaced with aqueous formaldehyde such as formalin. When paraformaldehyde is used alone, a small amount of water is added to promote the reaction. Generally this amount may range between 0.2 and 1 mol of water per mol of phenol.

The catalyst for the condensation reaction is barium hydroxide or the octahydrate thereof. It may be formed in situ by adding equivalent amounts of barium oxide or barium carbonate. The amount of catalyst should be sufficient to create a pH of 7.2–9 in the reaction medium. Generally amounts ranging from 0.01–0.1 mol of barium hydroxide per mol of phenol is sufficient.

The condensation reaction should be started at 30° C. As soon as the paraformaldehyde starts to dissolve, heat is released and the temperature of the reaction rises slowly. When the temperature reaches 55 to 60° C., vacuum should be applied to the system so that the reaction proceeds at 55 to 60° C. under reduced pressure until all of the paraformaldehyde is dissolved. The temperature of the reaction medium should then be raised to 65 to 75° C. and maintained at that temperature under reflux conditions at reduced pressure until the free formaldehyde content of the reaction medium is reduced to less than 5% by weight.

As soon as the desired formaldehyde concentration is achieved, the reaction medium should be cooled quickly to at least 30° C. and preferably to about 25° C. At this point, the reaction medium should be neutralized with orthophosphoric acid to a pH of 6.0–7.5. After the desired pH range is attained, the reaction medium should be diluted with sufficient cool water to produce a solution containing 50% solids by weight or less. On dilution, the neutralized barium catalyst precipitates in crystalline form. These crystals may be removed quickly and easily by simple filtration operations. The crystals are larger and more quickly formed at a pH of 6.0–6.2.

The neutralizing material should be orthophosphoric acid or one of the other phosporic acids which revert to the ortho form in the presence of sufficient amounts of water. Among such phosphoric acids are meta-, hypo-, and pyro-phosphoric acids.

The liquid phenolic resins of this invention are nearly water-white in color, contain almost no inorganic material, are infinitely dilutable with water, and do not discolor to any great extent on heating or exposure to light. They are particularly useful as binders for mineral wools such as rockwool because of their light color and the fact that after curing they have a very low moisture pick-up. Insulation prepared therewith is substantially waterproof.

For some purposes it is desirable to add conventional modifiers such as pigments, dyes, fillers, lubricants etc., and no difficulty is found is making these additions by conventional methods.

What is claimed is:

1. A process for preparing a liquid phenolic resin which comprises: (1) condensing 1 mol of a monohydric phenol with from 0.8–3 mols of paraformaldehyde in the presence of 0.01–0.1 mol of a catalyst taken from the group consisting of barium oxide, barium hydroxide, barium hydroxide octahydrate, and barium carbonate, and in the presence of 0.2 to 1 mol of water said condensation reaction being maintained at a temperature of 30 to 60° C. until the paraformaldehyde is dissolved and then continued at 65 to 75° C. under reflux at reduced pressure until the free formaldehyde content is less than 5% by weight, (2) thereafter cooling the reaction medium to less than 30° C., (3) neutralizing the cooled reaction medium with orthophosphoric acid to a pH of 6.0–7.5, (4) diluting the neutralized medium with cool water to less than 50% solids by weight, whereby a crystalline precipitate is obtained and (5) filtering the reaction medium.

2. A process as in claim 1 wherein the monohydric phenol is phenol.

3. A process as in claim 1 wherein a small proportion of the paraformaldehyde is substituted by aqueous formaldehyde.

4. A process as in claim 1 wherein the reaction medium after cooling is neutralized with orthophosphoric acid to a pH of 6.0–6.2.

References Cited in the file of this patent

UNITED STATES PATENTS

| | | |
|---|---|---|
| 1,903,809 | Ellis | Apr. 18, 1933 |
| 2,190,672 | Meharg | Feb. 20, 1940 |
| 2,400,718 | Siegel | May 21, 1946 |